US012809793B2

(12) United States Patent
Cooney et al.

(10) Patent No.: US 12,809,793 B2
(45) Date of Patent: Nov. 24, 2026

(54) METHOD FOR COMMUNICATION BETWEEN COMPONENTS OF AN ELECTRICAL DEVICE

(71) Applicant: Lutron Technology Company LLC, Coopersburg, PA (US)

(72) Inventors: Andrew Karl Cooney, Boynton Beach, FL (US); Devin N. Malanaphy, Somerville, MA (US); Matthew J. Price, Melrose, MA (US); Scott E. Shaw, Macungie, PA (US); Derek Thrasher, Framingham, MA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 18/932,094

(22) Filed: Oct. 30, 2024

(65) Prior Publication Data

US 2025/0053523 A1 Feb. 13, 2025

Related U.S. Application Data

(63) Continuation of application No. 17/971,138, filed on Oct. 21, 2022, now Pat. No. 12,158,850.

(Continued)

(51) Int. Cl.

*G06F 13/16* (2006.01)
*G06F 13/24* (2006.01)

(Continued)

(52) U.S. Cl.

CPC .......... *G06F 13/1673* (2013.01); *G06F 13/24* (2013.01); *G06F 13/28* (2013.01)

(58) Field of Classification Search

CPC ... G05B 19/408; H04W 56/0045; H04L 47/28
See application file for complete search history.

(56) References Cited

U.S. PATENT DOCUMENTS

| | | | |
|---|---|---|---|
| 5,793,993 | A | 8/1998 | Broedner et al. |
| 7,369,060 | B2 | 5/2008 | Veskovic et al. |

(Continued)

FOREIGN PATENT DOCUMENTS

| | | |
|---|---|---|
| EP | 2466481 A1 | 6/2012 |

OTHER PUBLICATIONS

"DigiPyro", Excelitas Technologies, Jan. 4, 2021, 14 pages.

*Primary Examiner* — Getente A Yimer
(74) *Attorney, Agent, or Firm* — Flaster Greenberg P.C.

(57) ABSTRACT

A control device may include a processor may include a core, a timer peripheral, and a peripheral direct memory access controller. The processor may include a receive port coupled to a communication port of the reporting device via a communication line. The control device may include a timer peripheral that can generate an enable signal and a timing signal, and a buffer circuit that may include an enable port for the enable signal for enabling/disabling the buffer circuit, an input port for the timing signal, and an output port coupled to the communication line. The processor may enable/disable the buffer circuit to control the timing of data bit(s) transmission across the communication line by the reporting device. The peripheral direct memory access controller may store the data bit(s) in a receive buffer during the bit period, and the core may subsequently retrieve the data bit(s) from the receiver buffer.

20 Claims, 4 Drawing Sheets

Related U.S. Application Data

(60) Provisional application No. 63/262,939, filed on Oct. 22, 2021.

(51) Int. Cl.
*G06F 13/28* (2006.01)
*G06F 13/42* (2006.01)

(56) References Cited

U.S. PATENT DOCUMENTS

| | | | | |
|---|---|---|---|---|
| 7,764,479 | B2 | 7/2010 | Chitta et al. | |
| 7,787,485 | B2 | 8/2010 | Howe et al. | |
| 8,306,051 | B2 | 11/2012 | Stocker | |
| 9,681,513 | B2 | 6/2017 | Dadashnialehi et al. | |
| 9,699,863 | B2 | 7/2017 | Weightman et al. | |
| 2006/0039408 | A1 | 2/2006 | Wortel et al. | |
| 2015/0071281 | A1* | 3/2015 | Shiotani | H04L 47/283 370/350 |
| 2015/0186307 | A1 | 7/2015 | Li et al. | |
| 2016/0062342 | A1* | 3/2016 | Kubo | G05B 19/414 700/170 |
| 2018/0165240 | A1* | 6/2018 | Reinig | G06F 13/4022 |
| 2019/0041507 | A1* | 2/2019 | Nishiyama | G01S 11/00 |
| 2019/0121489 | A1 | 4/2019 | Fleck et al. | |
| 2019/0130135 | A1* | 5/2019 | Park | G06F 3/0604 |
| 2019/0303289 | A1* | 10/2019 | Yoshii | G06F 12/0246 |
| 2020/0319748 | A1* | 10/2020 | Fleck | G06F 13/4282 |
| 2022/0321499 | A1 | 10/2022 | Diferdinando | |

* cited by examiner

METHOD FOR COMMUNICATION BETWEEN COMPONENTS OF AN ELECTRICAL DEVICE

CROSS-REFERENCE TO RELATED APPLICATIONS

This application is a continuation of U.S. Non-Provisional patent application Ser. No. 17/971,138, filed Oct. 21, 2022, which claims the benefit of U.S. Provisional Patent Application No. 63/262,939, filed Oct. 22, 2021, the contents of which are incorporated herein by reference in their entirety.

BACKGROUND

Some devices are configured to communicate according to a bidirectional communication scheme. When communicating according to a bidirectional communication scheme, the devices may be capable of transmitting data and/or receiving data across a communication line (e.g., between the communication line and circuit common). The devices may have to alternate who has control over the communication line (e.g., control or alternate which device can transmit data across the communication line). Accordingly, the devices may coordinate the communication between the devices accordingly to a defined bidirectional communication scheme, for example, so that each device knows when to control the line and when to read the line. In some instances, one device, such as a processor may be coupled to an external device that is configured to communicate according to a bidirectional communication scheme, such as a sensor. In such instances, the processor may have to dedicate significant processing time and other resources to ensure compliance with the bidirectional communication scheme defined by the external device, for example, due to the requirements placed upon the processor by the constant switching between transmitting and receiving data with the external device over the communication line.

In some solutions, the processor may perform bit banging where, for example, a timer and core of the processor may actively clock out the bits and capture the values for each bit manually. This requires constant and repeated processing time by the core and limits the processor to only communicating with the external device (e.g., sensor). For example, if the processor was allocated other tasks that required processing at critical times (e.g., for enabling wireless communication), the processor would be unable to both meet the requirements of the bidirectional communication scheme defined by the external device and perform the additional tasks (e.g., send and receive signals in accordance with a wireless communication scheme).

SUMMARY

As disclosed herein, some processors include not just a microprocessor core, but also one or more peripherals, such as a timer peripheral, a direct memory access (DMA) controller (PDC), Universal Synchronous/Asynchronous Receiver/Transmitter (USART), Synchronous Serial Controller (SSC), Serial Peripheral Interface (SPI), memory, etc. The processor may configure one or more of the peripherals, such as the PDC and timer peripherals to automate the data sampling with a reporting device (e.g., a sensor) that is configured with a bidirectional communication scheme. In order to maintain communication with the reporting device in accordance with the bidirectional communication scheme, the system may include a buffer circuit that is configured between a data line of the processor and the reporting device.

Through the use of the buffer circuit, the peripherals of the processor may be configured to maintain communication with the reporting device in accordance with the bidirectional communication scheme, which may allow the core of the core to attend to other, possibly critical tasks (e.g., conduct wireless communication with other devices, etc.). This may enable the processor to serve multiple functions and devices, without having to dedicate the resources of the core to the bidirectional communication scheme defined by one reporting device. For example, any communication bits received from the reporting device may be stored by the peripherals in a buffer of the processor. Then, during times when the core is not scheduled to perform other tasks, for example, the communication bits may be transferred from the buffer to random-access memory (RAM) of the processor for the microprocessor core to read the bits and perform one or more actions accordingly.

A control device may include a reporting device comprising a communication port, a processor, and a buffer circuit (e.g., a tri-state buffer). The processor may include a core, a timer peripheral, a peripheral direct memory access controller, and a receive port coupled to the communication port of the reporting device via a communication line (e.g., between the communication line and circuit common). The timer peripheral may be configured to generate an enable signal and a timing signal. The buffer circuit may include an enable port configured to receive the enable signal from the timer peripheral for enabling and disabling the buffer circuit. The buffer circuit may also include an input port configured to receive the timing signal from the timer peripheral and an output port coupled to the communication line. The processor and the reporting device may be configured to generate a communication signal on the communication line. The processor may be configured to enable the buffer circuit and control the timing signal to cause the buffer circuit to generate a timing pulse during a timing period in the communication signal on the communication line. The processor may be configured to disable the buffer circuit to allow the reporting device to transmit at least one data bit on the communication line in a bit period immediately following the timing pulse. The peripheral direct memory access controller of the processor may be configured to store the at least one data bit received via the receive port in a receive buffer during the bit period, and the core of the processor may be configured to subsequently retrieve the at least one data bit from the receiver buffer.

The core may be configured to retrieve the at least one data bit from the receiver buffer independent of any interaction of the timer peripheral and the peripheral direct memory access controller with the reporting device. The core may be configured to configure the operation of at least one of the peripheral direct memory access controller or the timer peripheral according to a communication scheme defined by the reporting device. The communication scheme may define a plurality of communication cycle periods, wherein each communication cycle period comprises a start period, a data period, a stop period, and an idle period. Each data cycle may include a plurality of sampling periods with each sampling period having a timing period before a bit period. The reporting device may be configured to communicate one or more data bits to the peripheral direct memory access controller of the processor during each bit period. The core may be configured to retrieve the at least one data bit from the receiver buffer during the idle period. The peripheral direct memory access controller may be configured to configure the timer peripheral to generate the enable signal for disabling the buffer circuit during the idle period. The core of the processor may be configured to configure the peripheral direct memory access controller for initiating the start period, the data period, the stop period, and the idle period of the communication cycle periods during execution of the communication scheme. For example, the core of the processor may be configured to configure the peripheral direct memory access controller to reconfigure the timer peripheral at the beginning of the start period, the data period, the stop period, and the idle period of the communication cycle periods and to store the at least one data bit in the receive buffer. The peripheral direct memory access controller may be configured to configure the timer peripheral to generate the timing signal and the enable signal for producing a start pulse during the start period. The timer peripheral may be configured to drive the enable signal and the timing signal high to generate the start pulse. The start pulse may be defined by a longer time duration than the timing pulse. The communication scheme may define a timing of a transmission of the at least one data bit from the reporting device to the processor along the communication line.

When the buffer circuit is enabled, the timer peripheral may be configured to control the communication signal on the communication line to the reporting device. When the buffer circuit is enabled, the timer peripheral may be configured to control the state of the communication signal on the communication line based on the state of the timing signal provided to the input port of the buffer circuit. When the buffer circuit is enabled, the timer peripheral may be configured to control whether the communication signal on the communication line is in a low state or a high state based on the state of the timing signal provided to the input port of the buffer circuit. The core may be configured to retrieve the at least one data bit from the receiver buffer during times when the core is not performing critical tasks or controlling or communication with other devices. The core may be configured to control one or more electrical loads based on the bits. The core may be configured to configure the timer peripheral and the peripheral direct memory access controller based on the bits.

DETAILED DESCRIPTION

Figure 1A:
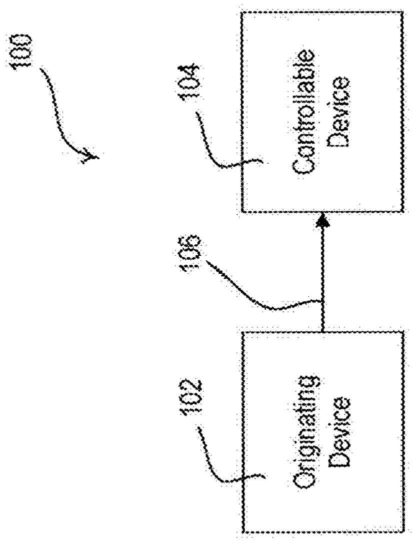
FIG. 1A is a block diagram of an example system that comprises an originating device, a controllable device, and a control link, where the originating device is configured to communicate directly with the controllable device via the control link.

FIG. 1A is a block diagram of an example system 100 that comprises an originating device 102, a controllable device 104, and a control link 106. In the system 100, the controllable device 104 may be controlled by the originating device 102 via the control link 106 (e.g., directly via the control link 106).

The originating device 102 may be a device that is configured to sense a condition, generate data (e.g., control data, such as a command) in response to the sensed condition, and send data to the controllable device 104 in response to the sensed condition via the control link 106. The originating device 102 may comprise any combination of an occupant detection device (e.g., an occupant detection sensor, occupant counter, etc.), a vacancy detection device (e.g., a vacancy sensor), and/or a daylight detection device (e.g., a daylight sensor). In some examples, the originating device 102 may include any combination of sensors, such as a digital passive infrared (PIR) occupant sensor, a radar occupant sensor, an ultrasonic occupant sensor, a microwave occupant sensor, a photosensor, a visible light sensor, a color temperature sensor, a radiometer, a cloudy day sensor, a temperature sensor, a humidity sensor, a pressure sensor, a smoke detector, a carbon monoxide detector, an air-quality sensor, a security sensor, a proximity sensor, a motion sensor, a fixture sensor, a partition sensor, a keypad, a kinetic or solar-powered remote control, a key fob, a time clock, an audio-visual control, a safety device, a power monitoring device (e.g., such as power meters, energy meters, utility submeters, utility rate meters, etc.), a central control transmitter, and/or a residential, commercial, or industrial controller.

When the originating device 102 is configured as an occupancy and/or vacancy sensor, the occupancy and/or vacancy sensor may be configured to detect an occupancy and/or a vacancy condition in a space around the originating device 102. The originating device 102 may be configured to transmit control data to the controllable device 104 via the control link 106 in response to detecting the occupancy and/or vacancy condition. The controllable device 104 may be configured to adjust an operating characteristic (e.g., an intensity level of a lighting load) in response to the detected occupancy and/or vacancy condition. Examples of occupancy and vacancy sensors are described in greater detail in commonly-assigned U.S. Pat. No. 8,009,042, issued Aug. 30, 2011, entitled RADIO FREQUENCY LIGHTING CONTROL SYSTEM WITH OCCUPANCY SENSING, the entire disclosure of which is hereby incorporated by reference.

When the originating device 102 is configured as a daylight sensor, the originating device 102 may be configured to measure a total light intensity in the space around the originating device 102. The originating device 102 may be configured to transmit control data, such as a measured light intensity, to the controllable device 104 via the control link 106. The controllable device 104 may be configured to adjust an operating characteristic (e.g., an intensity level of a lighting load) in response to the measured light intensity. Examples of daylight sensors are described in greater detail in commonly assigned U.S. Pat. No. 8,451,116, issued May 28, 2013, entitled WIRELESS BATTERY-POWERED DAYLIGHT SENSOR, the entire disclosure of which is hereby incorporated by reference.

The originating device 102 may be configured to communicate with other devices, such as the controllable device 104, via a wired and/or wireless control scheme. For example, the originating device 102 may comprise a wireless communication circuit, such as, for example, a radio-frequency (RF) transceiver coupled to an antenna for transmitting and/or receiving RF signals. The wireless communication circuit may be an RF transmitter for transmitting RF signals, an RF receiver for receiving RF signals, and/or an infrared (IR) transmitter and/or receiver for transmitting and/or receiving IR signals, or optical signals. Alternatively or additionally, the originating device 102 may comprise a wired communication circuit configured to be coupled to a wired control link, for example, a digital communication link and/or an analog control link, such as a 0-10V control link or a pulse-width modulated (PWM) control link. Further, the originating device 102 may be configured to transmit a control signal to the controllable device 104 via power wiring between the originating device 102 and the controllable device 104 using, for example, a power-line carrier (PLC) communication technique.

The originating device 102 may be configured to transmit a control signal to the controllable device 104. The control signal may include the control data (e.g., a digital message) generated by the originating device 102. The control data may include a command and/or identification information (e.g., such as a unique identifier) associated with the originating device 102. The originating device 102 may communicate with the controllable device 104 via the control link 106. The control link 106 may be wired or wireless. The control link 106 may enable one-way communication (e.g., from the originating device 102 to the controllable device 104, as illustrated) or may enable two-way communications. The control link 106 may enable digital communication using a wired or wireless communication protocol, such as the WI-FI, BLUETOOTH, BLUETOOTH LOW ENERGY (BLE), ZIGBEE, Z-WAVE, THREAD, DIGITAL ADDRESSABLE LIGHTING INTERFACE (DALI), and/or CLEAR CONNECT (e.g., the CLEAR CONNECT TYPE A and/or the CLEAR CONNECT TYPE X) protocols. The control link 106 may also provide for analog communication using analog control signals (e.g., 0-10V signals and/or pulse-width modulated (PWM) signals).

The control link 106 may be internal to a device and/or external to the device. For example, the originating device 102, the controllable device 104, and the control link 106 may all reside within a single device (e.g., within the housing of a single device, such as a dimmer switch or a lighting fixture), or the originating device 102 and the controllable device 104 may be separate devices (e.g., located within their own respective housings external to one another), and the control link 106 may enable communication between the originating device 102 and the controllable device 104 (e.g., when the originating device 102 and the controllable device 104 are separate components within a larger load control system and the control link 106 allows for communication between the devices).

The controllable device 104 may be a device (e.g., a load control device, such as a switching device, a dimmer switch, a light-emitting diode (LED) driver, and/or a controllable light source) or component of a device (e.g., a control circuit configured to control a semiconductor switching component, such as one or more thyrsistors and/or field-effect transistors (FETs)) that is configured to be responsive to the originating device 102 (e.g., directly, such as is illustrated in FIG. 1A). The controllable device 104 may be configured to control an electrical load (e.g., an internal and/or external electrical load) in response to the control data received from the originating device 102 via the control link 106.

In some examples, the controllable device 104 may be a dimmer switch for one or more lighting loads, an LED driver for driving an LED light source, a drive unit for controlling a motorized window treatment or a projection screen, a drive unit for controlling a motor control device (e.g., a ceiling or exhaust fan), a heating, ventilation, and air-conditioning (HVAC) controller, a drive unit for controlling a speaker, a television, and/or a drive unit for controlling an appliance. For example, the controllable device 104 may include any combination of a dimming ballast for driving a gas-discharge lamp; an LED driver for driving an LED light source; a dimming circuit for controlling the intensity of a lighting load; a screw-in luminaire including a dimmer circuit and an incandescent or halogen lamp; a screw-in luminaire including a ballast and a compact fluorescent lamp; a screw-in luminaire including an LED driver and an LED light source; an electronic switch, controllable circuit breaker, or other switching device for turning an appliance on and off; a plug-in load control device, controllable electrical receptacle, or controllable power strip for controlling one or more plug-in loads; a motor control unit for controlling a motor load, such as a ceiling fan or an exhaust fan; a drive unit for controlling a motorized window treatment or a projection screen; one or more motorized interior and/or exterior shutters; a thermostat for a heating and/or cooling system; a temperature control device for controlling a setpoint temperature of an HVAC system; an air conditioner; a compressor; an electric baseboard heater controller; a controllable damper; a variable air volume controller; a fresh air intake controller; a ventilation controller; one or more hydraulic valves for use in radiators and radiant heating system; a humidity control unit; a humidifier; a dehumidifier; a water heater; a boiler controller; a pool pump; a refrigerator; a freezer; a television and/or computer monitor; a video camera; a volume control; an audio system or amplifier; an elevator; a power supply; a generator; an electric charger, such as an electric vehicle charger; an alternative energy controller; and/or the like.

Figure 1B:
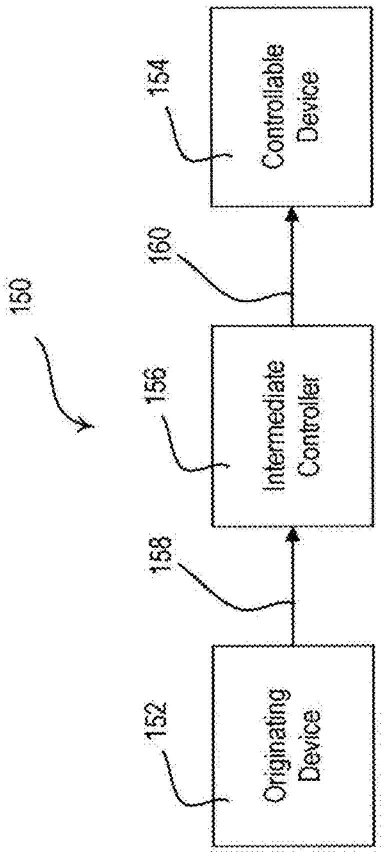
FIG. 1B is a block diagram of an example system that comprises an originating device, a controllable device, an intermediate controller, and one or more control links, where the originating device is configured to communicate indirectly with the controllable device via the intermediate controller.

FIG. 1B is a block diagram of an example system 150 that comprises an originating device 152, a controllable device 154, an intermediate controller 156, and a plurality of control links 158, 160, where the originating device 152 is configured to communicate indirectly with the controllable device 154 via the intermediate controller 156. The originating device 152 may be an example of the originating device 102. The controllable device 154 may be an example of the controllable device 104. The control links 158, 160 may be an example of the control link 106. The control link 158 may be the same type of control link as the control link 160 (e.g., wired or wireless, and/or type of communication technique), or the control link 158 may be a different type of control link as the control link 160. For instance, in some examples, both of the control links 158, 160 may be wireless control links such that, for example, the originating device 152 may be configured to communicate with the intermediate controller 156 over the wireless control link 158, and the intermediate controller 156 may be configured to communicate with the controllable device 154 over the wireless control link 160.

The intermediate controller 156 may be, for example, a system controller, a fixture controller, a wireless controller, a system bridge, a hub device, a network device, a server, etc. The intermediate controller 156 may be configured to communicate with one or more external, network devices, such as another electrical load in the load control system, a smartphone, a tablet, a computer, and/or another device that is unable to communicate with other devices within the system 150, for example. The intermediate controller 156 may be configured to communicate analog and/or digital messages via a wired and/or wireless control scheme. For example, the intermediate controller 156 may comprise a wireless communication circuit, such as, for example, a radio-frequency (RF) transceiver coupled to an antenna for transmitting and/or receiving RF signals. The wireless communication circuit may be an RF transmitter for transmitting RF signals, an RF receiver for receiving RF signals, and/or an infrared (IR) transmitter and/or receiver for transmitting and/or receiving IR signals. Alternatively or additionally, the intermediate controller 156 may be configured to be coupled to a wired control link, for example, a digital communication link, an analog control link (e.g., such as a 0-10V control link), and/or a pulse-width modulated (PWM) control link.

As noted herein, any combination of the originating device 152, the controllable device 154 and the intermediate controller 156 may all reside within the same housing. For instance, in one example, the originating device 152, the intermediate controller 156, and the controllable device 154 may be located in the same lighting fixture.

Figure 2:
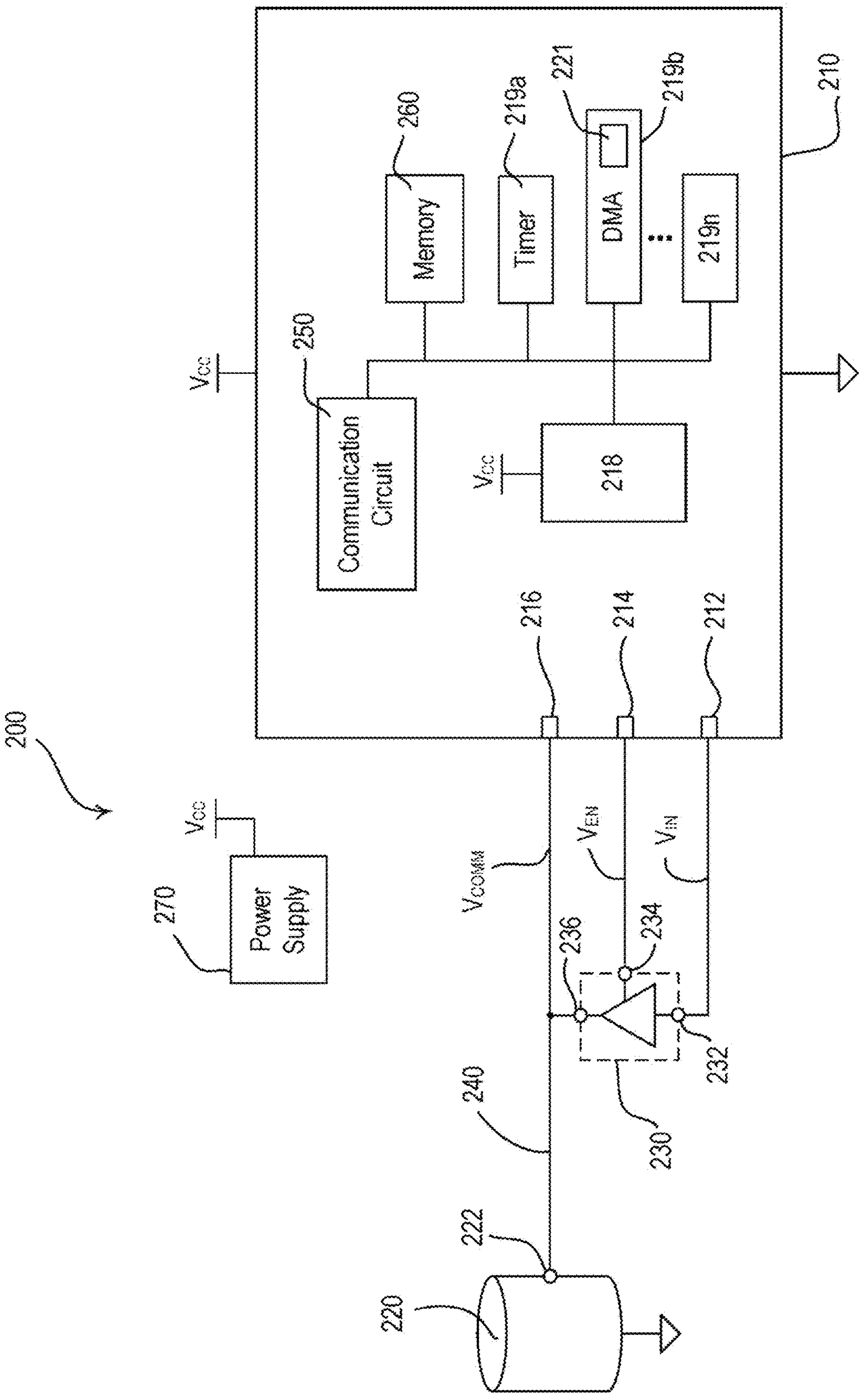
FIG. 2 is a block diagram of an example originating device that comprises a processor, a reporting device, and a tri-state buffer.

FIG. 2 is a block diagram of an example control device 200 that may comprise a processor 210, a reporting device 220 (e.g., a communication device), and a multi-port logic circuit, such as a tri-state buffer 230. The control device 200 may be an example of the originating device 102 of FIG. 1A and/or the originating device 152 of FIG. 1B. The control device 200 may be configured to sense a condition, generate control data (e.g., such as a command) in response to the sensed condition, and send a control signal (e.g., such as a message including the command) to a controllable device (e.g., the controllable device 104 and/or the controllable device 154) in response to the sensed condition via a control link (e.g., directly via a control link, such as the control link 106, or indirectly via an intermediate controller, such as the intermediate controller 156, via one or more control link, such as the control links 158, 160) via a communication circuit 250.

The reporting device 220 may operate as, for example, an occupancy detection device (e.g., an occupant detection sensor, occupant counter, etc.), a vacancy detection device (e.g., a vacancy sensor), and/or a daylight detection device (e.g., a daylight sensor). In some examples, the reporting device 220 may include (e.g., may be) a sensing element, such as a digital pyroelectric detector. In some examples, the reporting device 220 may include any combination of sensors, such as a digital passive infrared (PIR) occupant sensor, a radar occupant sensor, an ultrasonic occupant sensor, a microwave occupant sensor, a photosensor, a visible light sensor, a color temperature sensor, a radiometer, a cloudy day sensor, a temperature sensor, a humidity sensor, a pressure sensor, a smoke detector, a carbon monoxide detector, an air-quality sensor, a security sensor, a proximity sensor, a motion sensor, a fixture sensor, a partition sensor, a keypad, a kinetic or solar-powered remote control, a key fob, a time clock, an audio-visual control, a safety device, a power monitoring device (e.g., such as power meters, energy meters, utility submeters, utility rate meters, etc.), a central control transmitter, and/or a residential, commercial, or industrial controller.

The reporting device 220 may be configured to communicate with the processor 210 over a control link 240, for example, according to a bidirectional communication scheme. The bidirectional communication scheme may also be referred to as an intra-board communication scheme, a chip-to-chip communication scheme, a managed communication scheme, a master-slave communication scheme, and/or a point-to-point communication scheme.

The control link 240 and/or bidirectional communication scheme may allow for communication in a single direction at any given time instance, for example, from the processor 210 to the reporting device 220, or from the reporting device 220 to the processor 210, but not in both directions simultaneously. For example, the bidirectional communication scheme may allow for communication of control data in one direction (e.g., from the reporting device 220 to the processor 210) and the transmission (e.g., generation) of communication-management signals in the other direction (e.g., from the processor 210 to the reporting device 220) to facilitate the data communication. For instance, at any given time, either the processor 210 may control a state of the control link 240 or the reporting device 220 may control the state of the control link 240. In some examples, the control link 240 may be controlled by one of the processor 210 or the reporting device 220 to be in a high state (e.g., at approximately the magnitude of a rated supply voltage of the reporting device 220, such as approximately 3.3 V) or a low state (e.g., at approximately circuit common, such as approximately 0 V). The processor 210 (e.g., the ports of the processor 210), the reporting device 200, and/or the tri-state buffer 230 may be controlled to a high-impedance state when, for example, neither the processor 210 nor the reporting device 220 are controlling the control link 240 (e.g., when the tri-state buffer 230 is disabled or when the reporting device 220 is not controlling the state of the control link). Further, in some examples, the processor 210 may be configured to control the timing of any control data transmitted by the reporting device 220 (e.g., as described herein).

The processor 210 may comprise a core 218, one or more peripherals 219*a*-219*n*, and memory 260. The core 218 may include electronic circuitry that executes instructions comprising a computer program(s). The core 218 may perform one or more functions, such as logic, controlling, and input/output (I/O) operations specified by one or more computer programs. The peripherals 219*a*-219*n* may be configured to perform one or more functions independent of the core 218. Each peripheral 219*a*-219*n* may be configured with various operational settings. For example, the processor 210 may include any combination of a timer peripheral 219*a*, a peripheral direct memory access (DMA) controller (PDC) 219*b*, a Universal Synchronous/Asynchronous Receiver/Transmitter (USART), a Synchronous Serial Controller (SSC), a Serial Peripheral Interface (SPI), logic gates, flip-flops, filters, latches, etc. For example, the peripheral DMA controller 219*b* may include a first in first out (FIFO) buffer with control features for driving one or more software modules included in the processor 210 (e.g., universal asynchronous receiver-transmitters (UARTs)). The processor 210 may include a receive buffer 221 that is configured to receive and store the communication bits from the reporting device 220 prior to the communication bits being read by the core 218. For example, the peripheral DMA controller 219*b* may comprise the receive buffer 221. The timer peripheral 219*a* may be configured to trigger a specific action after a certain length of time and/or a certain amount of clock cycles. For example, the timer peripheral 219*a* may be configured to generate timer signals, such as pulse-width modulated (PWM) signals (e.g., as illustrated by the input control signal and the enable control signal in FIG. 3), which may enable control of components and/or circuits external to the processor 210. Further, in some examples, the timer peripheral 219*a* may comprise a buffer (e.g., a dedicated buffer).

The processor 210 may configure one or more of the peripherals 219*a*-219*n*, such as the peripheral DMA controller 219*b* and the timer peripheral 219*a*, to control the communication to and from the reporting device 220 according to a bidirectional communication scheme, for example, by enabling and disabling the tri-state buffer 230, as described below. The bidirectional communication scheme may be defined by the reporting device 220. The tri-state buffer 230 of the control device 200 may enable communication with the reporting device 220 in accordance with the bidirectional communication scheme using the peripherals 219*a*-219*n* of the processor 210.

Through the use of the tri-state buffer 230, the peripherals 219*a*-219*n* of the processor 210 may be configured to maintain communication between the processor 210 and the reporting device 220, which may allow the core 218 to attend to other, possibly critical tasks (e.g., manage wireless/wired communication with other devices via the communication circuit 250, etc.). This may enable the processor 210 to execute multiple functions and/or interface with external devices without having to dedicate the resources of the core 218 to the bidirectional communication scheme defined by the reporting device 220. For example, any communication bits received from the reporting device 220 may be stored by one or more of the peripherals 219*a*-219*n* (e.g., such as by the peripheral DMA controller 219*b*) in the receive buffer 221 of the processor 210. Then, during times when the core 218 is not scheduled to perform other tasks, for example, the core 218 may be configured to transfer the communication bits from the receive buffer 221 to the memory 260 so that the core 218 may read the communication bits and perform one or more actions accordingly based on the communication bits.

The processor 210 may be connected to a communication port 222 of the reporting device 220 and further connected to the tri-state buffer 230 via one or more ports (e.g., pins) of the processor 210. The processor 210 may include a plurality of ports, such as a first port 212, a second port 214, and a third port 216. Although illustrated with only three ports, the processor 210 may include more ports, such as anywhere from tens to thousands of ports, for example, and as understood and appreciated by those in the art.

The tri-state buffer 230 may include three ports, such as an input port 232, an enable port 234, and an output port 236. The first port 212 of the processor 210 may be coupled to the input port 232, the second port 214 of the processor 210 may be coupled to the enable port 234, and the third port 216 of the processor 210 may be coupled to the output port 236. The output port 236 of the tri-state buffer 230 may be coupled to the third port 216 of the processor 210 and the communication port 222 of the reporting device 220 on a control link 240 that connects the communication port 222 of the reporting device 220 and the third port 216 of the processor 210. The tri-state buffer 230 may be referenced to circuit common.

The processor 210 (e.g., the timer peripheral 219*a* of the processor 210) may be configured to enable and disable the tri-state buffer 230 via the second port 214. When enabled, the processor 210 may be configured to communicate on the control link 240 to the reporting device 220. For example, when the tri-state buffer 230 is enabled, the processor 210 may control the state of the output port 236 of the tri-state buffer 230 (e.g., control whether the control link 240 is in the low state or the high state). When the processor 210 disables the tri-state buffer 230 (e.g., places the output port 236 of the tri-state buffer 230 into the high-impedance state), the reporting device 220 may be configured to transmit data to the first port 216 of the processor 210 via the control link 240 according to a control scheme defined by the reporting device 220 (e.g., according to the bidirectional communication scheme). For example, when the tri-state buffer 230 is disabled, the reporting device 220 may be configured to control the state of the control link 240 (e.g., to control whether the control link 240 is in the low state or the high state).

The processor 210 (e.g., the timer peripheral 219*a* of the processor 210) may enable or disable the tri-state buffer 230 using the one or more timer signals generated by the processor 210 and provided to the tri-state buffer 230. For example, the timer peripheral 219*a* may control the enable port 234 of the tri-state buffer 230 via the second port 214 to be in the high state or the low state. For instance, the timer peripheral 219*a* may generate an enable signal $V_{EN}$ at the second port 214 in the high state to enable the tri-state buffer 230, and drive the magnitude of the enable signal $V_{EN}$ to the low state to disable the tri-state buffer 230.

The processor 210 and/or the reporting device 220 may be configured to generate a communication signal $V_{COMM}$ on the control link 240. The timer peripheral 219*a* may also be configured to generate a timing signal $V_{TIME}$ (e.g., an input signal $V_{IN}$) at the first port 212 to control the state of the input port 232 of the tri-state buffer 230. For example, when the tri-state buffer 230 is enabled (e.g., the enable signal $V_{EN}$ is driven into the high state), the timer peripheral 219*a* may be configured to control the timing signal $V_{TIME}$ to be in the high state or the low state to control the output port 236 of the tri-state buffer 230 to be in the high state or the low state, respectively. As such, the timer peripheral 219*a* may be configured to generate an interrupt symbol (e.g., a timing pulse or a timing symbol), in the communication signal $V_{COMM}$ on the control link 240, for example, using the enable signal $V_{EN}$ and/or the timing signal $V_{TIME}$ and the tri-state buffer 230. The interrupt symbol (e.g., the timing pulse or the timing symbol) may indicate to the reporting device 220 the timing of communications, for example, whether the processor 210 and/or the reporting device 220 can control the control link 240 to generate the communication signal $V_{COMM}$ according to the bidirectional communication scheme defined by the reporting device 220.

As noted herein, the timer peripheral 219*a* may drive the magnitude of the enable signal $V_{EN}$ at the second port 214 to the low state to disable the tri-state buffer 230. When the tri-state buffer 230 is disabled, the output port 236 of the tri-state buffer 230 may be in the high-impedance state. Therefore, for example, the timer peripheral 219*a* may be configured to place the output port 236 of the tri-state buffer 230 into the high-impedance state by driving the magnitude of the enable signal $V_{EN}$ to the low state. Accordingly, the timer peripheral 219*a* may control the state of the output port 236 to be in the high state, the low state, or the high-impedance state, for example, based on the state of the timing signal $V_{TIME}$ and the enable signal $V_{EN}$ generated at the first and second ports 212, 214, respectively.

Stated another way, the processor 210 (e.g., the timer peripheral 219*a* of the processor 210) may control the output port 236 of the tri-state buffer 230 to be in the low state by controlling the enable port 234 to be in the high state and controlling the input port 232 to be in the low state. Further, the processor 210 may control the output port 236 to be in the high state by controlling the enable port 234 to be in the high state and controlling the input port 232 to be in the high state. Finally, the processor 210 may control the output port 236 of the tri-state buffer 230 to be in the high-impedance state by controlling the enable port 234 to be in the low state. According, the processor 210 may control the input port 232 and the enable port 234 of the tri-state buffer 230 to control the state of the output port 236 to be in the high state, the low state, or the high-impedance state to control communication (e.g., the timing of communication) with the reporting device 220 on the control link 240, for example, according to the bidirectional communication scheme.

The processor 210 (e.g., the peripheral DMA controller 219*b* of the processor 210) may receive data from the reporting device 220 at the third port 216, for example, when the tri-state buffer 230 is disabled (e.g., the third port 216 may be a receive port of the processor). For example, the reporting device 220 may transmit data to the processor 210 via the low state). As discussed in more detail below, when the tri-state buffer 236 is disabled, the reporting device 220 may control the state of the control link 240 to be in the high state or the low state. In some examples, the reporting device 220 may control the state of the control link 240 to be in the high state to communicate a logic-high bit (e.g., a "1") to the processor 210, and control the control link 240 to be in the low state to communicate a logic-low bit (e.g., a "0") to the processor 210.

In response to receiving the communication bits, the processor 210 (e.g., the peripheral DMA controller 219*b* of the processor 210) may store the communication bits in the receive buffer 221 of the processor 210. The core 218 may retrieve the communication bits from the receive buffer 221 during times when the core 218 is not performing critical tasks or controlling or communication with other devices, for example. Accordingly, the processor 210 may communicate with the reporting device 220 over the control link 240 using one or more of its peripherals 219*a*-219*n*, store any received communication bits from the reporting device 220 in the receive buffer 221 of the peripheral DMA controller 219*b* of the processor 210, and have the core 218 retrieve the communication bits from the receive buffer 221 during times that do not interrupt the core's ability to perform critical tasks or communicate with other devices. As such, by leveraging the use of the peripherals 219*a*-219*n* and the tri-state buffer 230, the burden of managing the communication with the reporting device 220 is removed from the core 218, which reduces the number of interrupts required to service, control, and/or communicate with the reporting device 220.

The control device 200 may include a communication circuit 250, which may be communicatively coupled to the processor 210. Although illustrated as internal to the processor 210, in some examples, the communication circuit 250 may be external to the processor 210. The processor 210 may control the communication circuit 250 to communicate with external devices, such as a controllable device (e.g., the controllable device 104 and/or the controllable device 154), via a wired and/or wireless control scheme. For example, the communication circuit 250 may comprise a wireless communication circuit, such as, for example, a radio-frequency (RF) transceiver coupled to an antenna for transmitting and/or receiving RF signals. The wireless communication circuit may also comprise an RF transmitter for transmitting RF signals, an RF receiver for receiving RF signals, and/or an infrared (IR) transmitter and/or receiver for transmitting and/or receiving IR signals. Alternatively or additionally, the communication circuit 250 of the control device 200 may comprise a wired communication circuit configured to be coupled to a wired control link, for example, a digital communication link and/or an analog control link, such as a 0-10V control link or a pulse-width modulated (PWM) control link. Further, the communication circuit 250 may be coupled to power wiring (e.g., between an originating device and a controllable device), and may be configured to transmit a control signal via the electrical wiring using, for example, a power-line carrier (PLC) communication technique.

The communication circuit 250 may be configured to transmit (e.g., to the controllable device) a control signal (e.g., a communication signal and/or a digital message) that includes the control data generated by the control device 200. The control data may include a command and/or identification information (e.g., such as a unique identifier) associated with the control device 200. In addition to or in lieu of transmitting the control signal to the controllable device, the communication circuit 250 may be controlled to transmit the control signal to a controller of the system, such as an intermediate controller (e.g., the intermediate controller 156).

The control device 200 may include the memory 260. The memory 260 may be internal to the processor 210 (e.g., as shown), or in some examples, may be external to the processor 210. The memory 260 may be communicatively coupled to the processor 210 for the storage and/or retrieval of, for example, data from the reporting device 220 or other internal component of the control device 200, operational settings of the processor 210, the reporting device 220, and/or the communication circuit 250, and/or data received from external sources, such as a controllable device and/or a system controller (e.g., an intermediate controller). In some examples, the memory 260 may be random access memory (RAM). The memory 260 may be implemented as an external integrated circuit (IC) and/or as an internal circuit of the processor 210 (e.g., as the internal memory of the processor 210, as described herein). Further, it should be appreciated that in some examples, any combination of the components of the control device 200 (e.g., the processor 210, the core 218, the peripherals 219*a*-219*n*, the reporting device 220, the tri-state buffer 230, the communication circuit 250, and/or the memory 260) may be implemented together in single integrated circuit and/or separately in different integrated circuits.

The originating device 200 may include a power supply 270. The power supply 270 may generate a direct current (DC) supply voltage $V_{CC}$ for powering the processor 210, the reporting device 220, the communication circuit 250, the memory 260, and/or the other low voltage circuitry of the control device 200.

Figure 3:
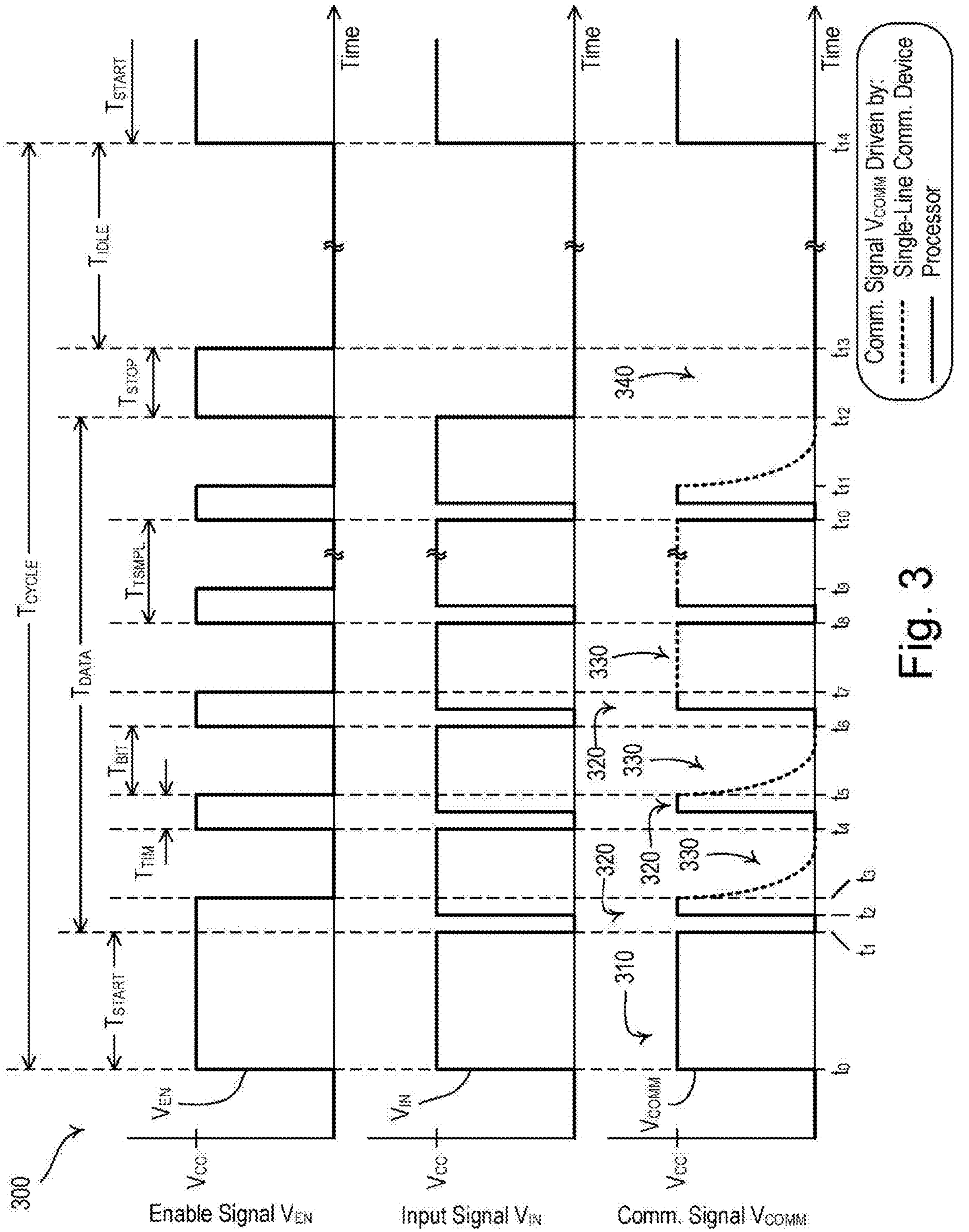
FIG. 3 shows example waveforms illustrating an example bidirectional communication scheme on a communication line between a processor and a reporting device.

FIG. 3 shows example waveforms 300 illustrating an example bidirectional communication scheme on a communication line (e.g., the control link 240) between a processor (e.g., the processor 210) and a reporting device (e.g., the reporting device 220). The waveforms 300 may be generated at the ports of a tri-state buffer (e.g., the tri-state buffer 230) by the processor and the reporting device. The processor may enable and disable the tri-state buffer to, for example, control the communication line according to the bidirectional communication scheme.

The bidirectional communication scheme may define the timing of a transmission of data (e.g., bits) from the reporting device to the processor on the communication line (e.g., between the communication line and circuit common). In the example bidirectional communication scheme defined by the waveforms 300, the processor and the reporting device may generate a communication signal $V_{COMM}$ on the communication line. To generate the communication signal $V_{COMM}$, the processor (e.g., one or more peripherals of the processor) may generate one or more communication-management signals, such as a start symbol 310 (e.g., a start pulse), a plurality of interrupt symbols 320 (e.g., timing edges), and a stop symbol 340 (e.g., a stop break), on the communication line, and the reporting device may generate a bit 330 between each interrupt symbol 320 on the communication line. As noted herein, one or more peripherals of the processor, such as a timer peripheral 219*a* and a peripheral DMA controller may be configured to control the output of the tri-state buffer and receive bits from the reporting device according to the bidirectional communication scheme, which for example, may free up the resources of the core of the processor (e.g., the core 218) to perform other tasks.

The processor may include a plurality of ports, such as a first port (e.g., the first port 212), a second port (e.g., the second port 214), and a third port (e.g., the third port 216). The reporting device may include a communication port (e.g., a single communication port, such as the communication port 222). The tri-state buffer may include three ports, such as an input port (e.g., the input port 232), an enable control port (e.g., the enable port 234), and an output port (e.g., the output port 236). The output port of the tri-state buffer may be coupled to the third port of the processor and the communication port of the reporting device on the communication line. As such, the communication line may connect the communication port of the reporting device and the third port of the processor.

According to the bidirectional communication scheme, the processor and the reporting device may generate the communication signal $V_{COMM}$ on a periodic basis at a communication cycle period $T_{CYCLE}$ (e.g., approximately 2 milliseconds). Each communication cycle period $T_{CYCLE}$ of the communication signal $V_{COMM}$ may include a start period $T_{START}$, a data period $T_{DATA}$, a stop period $T_{STOP}$, and an idle period $T_{IDLE}$. The communication signal $V_{COMM}$ may include the start symbol 310 during the start period $T_{START}$ (e.g., approximately 130 microseconds). For example, the processor may generate the start symbol 310 by controlling the tri-state buffer to drive the communication signal $V_{COMM}$ on the communication line to the high state during the start period $T_{START}$. The start symbol 310 may indicate the beginning of the communication cycle period $T_{CYCLE}$ (e.g., and/or the beginning of the data period $T_{DATA}$) to the reporting device.

The start period $T_{START}$ may be followed by the data period $T_{DATA}$, which may comprise a plurality of sampling periods $T_{SMPL}$. For example, each sampling period $T_{SMPL}$ may be approximately 10 microseconds. Each sampling period $T_{SMPL}$ may comprise a timing period $T_{TIM}$ followed by a bit period $T_{BIT}$ (e.g., a communication time slot). Each timing period $T_{TIM}$ may comprise one of the interrupt symbols 320. For example, the interrupt symbol 320 of the first sampling period $T_{SMPL}$ of the data period $T_{DATA}$ may immediately follow the start symbol 310 of the start period $T_{START}$. In some examples, the duration of the start symbol 310 may be greater than the duration of each of the interrupt symbols 320. The bit period $T_{BIT}$ may occur after each interrupt symbol 320. During the bit period $T_{BIT}$, the reporting device may communicate one or more data bits to the processor (e.g., to the peripheral DMA controller of the processor). The interrupt symbol 320 during each timing period $T_{TIM}$ may be configured to trigger an interrupt in the reporting device, which may trigger the reporting device to transmit the one or more data bits during the bit period $T_{BIT}$. The bidirectional communication scheme may define a predetermined number of sampling periods $T_{SMPL}$. (e.g., alternating timing periods $T_{TIM}$ and bit periods $T_{BIT}$). For example, the data period $T_{DATA}$ may include approximately 28 sampling periods $T_{SMPL}$. When a single data bit may be generated during each bit period $T_{BIT}$, the reporting device may be configured to transmit approximately 28 data bits during each data period $T_{DATA}$ (e.g., which may be approximately 280 microseconds).

The data period $T_{DATA}$ may be followed by the stop period $T_{STOP}$ (e.g., approximately 10 microseconds). The communication signal $V_{COMM}$ may include the stop break 340 during the stop period $T_{STOP}$. For example, the processor may generate the stop break 340 by controlling the tri-state buffer to drive the communication signal $V_{COMM}$ on the communication line to the low state during the stop period $T_{STOP}$. The stop period 340 may indicate the end of the data period $T_{DATA}$ and the beginning of the idle period $T_{IDLE}$ (e.g., approximately 1.58 milliseconds). During the idle period $T_{IDLE}$, the processor and the reporting device may not control the communication line (e.g., the third port 216 of the processor 210, the communication port 222 of the reporting device 220, and the output port 236 of the tri-state buffer 230 may each be in the high-impedance state), such that the communication signal $V_{COMM}$ on the communication line remains in the low state.

As noted above, the processor (e.g., one or more peripherals, such as the timer peripheral of the processor) may be configured to generate an enable signal $V_{EN}$ that is provided to the enable port of the tri-state buffer, and generate a timing signal $V_{TIME}$ that is provided to the input port of the tri-state buffer. As such, one or more peripherals, such as the timer peripheral, may be configured to control the state of the enable port (e.g., using the enable signal $V_{EN}$) and/or control the state of the input port (e.g., using the timing signal $V_{TIME}$) to be in a low state (e.g., approximately 0 V) or in a high state (e.g., approximately 3.3 V). Accordingly, the processor (e.g., the timer peripheral) may be configured to enable or disable the tri-state buffer, for example, and to control the state of the communication line using the enable signal $V_{EN}$ and the timing signal $V_{TIME}$. Further, when the tri-state buffer is disabled (e.g., the enable signal $V_{EN}$ is in a low state), the communication line may be controlled by the reporting device. The communication signal $V_{COMM}$ may be generated on the communication line based on, for example, the processor (e.g., by controlling the enable signal $V_{EN}$ and the timing signal $V_{TIME}$) and/or the reporting device.

Referring to FIG. 3, the communication cycle period $T_{CYCLE}$ of the example bidirectional communication scheme may begin with the start symbol 310, which may be generated by the processor using the tri-state buffer. For example, the timer peripheral of the processor may be configured to control the enable signal $V_{EN}$ and the timing signal $V_{TIME}$ to both be in the high state from the time $t_0$ to the time $t_1$ to generate the start symbol 310 during the start period $T_{START}$. At the time $t_0$, the peripheral DMA controller of the processor may configure the timer peripheral to appropriately generate the enable signal $V_{EN}$ and the timing signal $V_{TIME}$ to produce the start symbol 310 in the communication signal $V_{COMM}$ during the start period $T_{START}$. When the enable signal $V_{EN}$ and the timing signal $V_{TIME}$ are both in the high state, the tri-state buffer may be enabled, and the communication line may be placed into the high state (e.g., due to the timing signal $V_{TIME}$ being in the high state). The start symbol 302 may signal to the reporting device the start of the communication cycle period $T_{CYCLE}$ and/or the start of the data period $T_{DATA}$.

After the start period $T_{START}$ (e.g., from the time $t_0$ to the time $t_1$), the timer peripheral may begin to generate the enable signal $V_{EN}$ and the timing signal $V_{TIME}$ to periodically generate the interrupt symbols 320 and disable the tri-state buffer to allow the reporting device to transmit the data bits 330 during the data period $T_{DATA}$ (e.g., from the time $t_1$ to the time $t_{12}$). At the time $t_1$, the peripheral DMA controller may configure the timer peripheral to appropriately generate the enable signal $V_{EN}$ and the timing signal $V_{TIME}$ during the data period $T_{DATA}$. As shown in FIG. 3, the timer peripheral may be configured to generate a first one of the interrupt symbols 320 during the timing period $T_{TIM}$ of the first sampling period $T_{SMPL}$. (e.g., from time $t_1$ to time $t_3$). The interrupt symbol 320 may be configured to trigger an interrupt in the reporting device. As such, the interrupt symbol 320 may be referred to as an interrupt symbol, in some examples. Further, in some examples, to generate the interrupt symbol 320, the processor (e.g., the timer peripheral) may be configured to control the enable signal $V_{EN}$ to be in the high state for the entire duration of the sampling period $T_{SMPL}$ (e.g., from the time $t_1$ to the time $t_3$), while the processor (e.g., the timer peripheral) may be configured to control the timing signal $V_{TIME}$ to be in the low state from the time $t_1$ to the time $t_2$, followed by the high state from the time $t_2$ to the time $t_3$. By enabling the tri-state buffer during the sampling period $T_{SMPL}$, the state of the communication signal 330 may follow the state of the timing signal $V_{TIME}$. As such, during the sampling period $T_{SMPL}$, the communication signal $V_{COMM}$ on the communication line may be in the low state from the time $t_1$ to the time $t_2$, followed by the high state from the time $t_2$ to the time $t_3$. For example, as shown in FIG. 3, the interrupt symbol 320 (e.g., the timing edge) may be a low-to-high transition. Alternatively, the interrupt symbol 320 may be a high-to-low transition.

After generating the first interrupt symbol 320, the processor (e.g., the timer peripheral) may disable the tri-state buffer during the first bit period $T_{BIT}$ (e.g., from the time $t_3$ to the time $t_4$). For example, at the time $t_3$, the processor (e.g., the timer peripheral) may drive the enable signal $V_{EN}$ to the low state, which may disable the tri-state buffer and place the output port of the tri-state buffer in a high-impedance state. During the bit period $T_{BIT}$ (e.g., from the time $t_3$ to the time $t_4$), the tri-state buffer may be disabled and the reporting device may be configured to control the communication signal $V_{COMM}$ on the communication line to be in the low state or the high state, for example, to communicate one or more data bits to the processor. The bit period $T_{BIT}$ may be referred to as a communication time slot. In one example, the reporting device may be configured to communicate a logic-low bit (e.g., a "0") to the processor by controlling the communication line to be in the low state during the bit period $T_{BIT}$, and be configured to communicate a logic-high bit (e.g., a "1") to the processor by controlling the communication line to be in the high state during the bit period $T_{BIT}$. In the example illustrated in FIG. 3, the reporting device communicates a logic-low bit (e.g., a "0") to the processor controlling the communication signal $V_{COMM}$ on the communication line to be in the low state during the first bit period $T_{BIT}$ (e.g., from the time $t_3$ to the time $t_4$) and the second bit period $T_{BIT}$ (e.g., from the time $t_5$ to the time $t_6$), and communicates a logic-high bit (e.g., a "1") to the processor controlling the communication signal $V_{COMM}$ on the communication line to be in the high state during the third bit period $T_{BIT}$ (e.g., from the time $t_7$ to the time $t_8$).

The data period $T_{DATA}$ of the communication cycle period $T_{CYCLE}$ according to the bidirectional communication scheme may include a plurality of sampling periods $T_{SMPL}$ each having alternating timing periods (e.g., having interrupt symbols) and bit periods $T_{BIT}$ (e.g., having data bits). For example, the second timing period $T_{TIM}$ (e.g., from the time $t_4$ to the time $t_5$) may have a second one of the interrupt symbols 320 and the second bit period $T_{BIT}$ (e.g., from the time $t_5$ to the time $t_6$) may have a second one of the data bits 330 (e.g., where the reporting device controls the communication signal $V_{COMM}$ on the communication line to be in the low state to transmit a logic-low bit). In addition, the third timing period $T_{TIM}$ (e.g., from the time $t_0$ to the time $t_7$) may have a third one of the interrupt symbols 320, and the third bit period $T_{BIT}$ (e.g., from the time $t_7$ to the time $t_8$) may have a third one of the data bits 330 (e.g., where the reporting device controls the communication signal $V_{COMM}$ on the communication line to be in the high state to transmit a logic-high bit).

Accordingly, the reporting device may be configured to control the magnitude of the communication signal $V_{COMM}$ on the communication line during each of the bit periods $T_{BIT}$ to transmit one or more data bits to the processor. For example, the peripheral DMA controller of the processor may be configured to sample the magnitude of the communication signal $V_{COMM}$ (e.g., at the third port 216 of the processor 210) to determine the data bits 330 during the bit periods $T_{BIT}$. Further, for example, the peripheral DMA controller may be configured to store the sampled data bits in a receive buffer of the peripheral DMA controller (e.g., the receive buffer 221 of the peripheral DMA controller 219*b*) during each bit period $T_{BIT}$ (e.g., near the end of each bit period $T_{BIT}$).

After the data period, the timer peripheral of the processor may be configured to generate the enable signal $V_{EN}$ and the timing signal $V_{TIME}$ to produce the stop symbol 340 in the communication signal $V_{COMM}$ on the communication line during the stop period $T_{STOP}$ (e.g., from the time $t_{12}$ to the time $t_{13}$). For example, the timer peripheral may control the enable signal $V_{EN}$ to be in the high state and the timing signal $V_{TIME}$ to be in low state from the time $t_{12}$ to the time $t_{13}$ to generate the stop symbol 340 during the stop period $T_{STOP}$. At the time $t_{12}$, the peripheral DMA controller may configure the timer peripheral to appropriately generate the enable signal $V_{EN}$ and the timing signal $V_{TIME}$ to produce the stop symbol 340 in the communication signal $V_{COMM}$ during the stop period $T_{STOP}$. When the enable signal $V_{EN}$ is in the high state and the timing signal $V_{TIME}$ is in the low state, the tri-state buffer may be enabled, and the communication line may be placed into the low state. The stop symbol 340 may signal to the reporting device the end of the data period $T_{DATA}$ and the start of the idle period $T_{IDLE}$.

After the stop period $T_{STOP}$, the timer peripheral may be configured to control the enable signal $V_{EN}$ to disable the tri-state buffer (e.g., to place the output port 236 of the tri-state buffer 230 in the high-impedance state) during the idle period $T_{IDLE}$ (e.g., from the time $t_{13}$ to the time t 14). For example, the timer peripheral may control the enable signal $V_{EN}$ to be in the low state from the time $t_{13}$ to the time $t_{14}$ to disable the tri-state buffer during the idle period $T_{IDLE}$. At the time $t_{13}$, the peripheral DMA controller may configure the timer peripheral to appropriately generate the enable signal $V_{EN}$ to disable the tri-state buffer during the idle period $T_{IDLE}$. Since the reporting device is not controlling the communication line during the idle period $T_{IDLE}$, the communication signal $V_{COMM}$ on the communication line may be in the low state. At the end of the idle period $T_{IDLE}$, the processor may control the tri-state buffer to generate the start symbol 310 during the start period $T_{START}$ of the next communication cycle period $T_{CYCLE}$ (e.g., at the time $t_{14}$).

At the beginning of the idle period $T_{IDLE}$ (e.g., at the time $t_{13}$), the peripheral DMA controller may be configured to generate a request to have the core of the processor (e.g., the core 218) transfer the sampled data bits from the receive buffer of the peripheral DMA controller to the memory of the processor (e.g., the memory 260, which for example, may be RAM of the processor), which for example, may occur during the idle period $T_{IDLE}$ (e.g., before the end of the idle period $T_{IDLE}$). After the sampled data bits are transferred to the RAM, the core of the processor may be configured to process the data bits from the RAM. The core may be configured to control one or more electrical loads (e.g., one or more controllable devices, such as the controllable device 104 and/or the controllable device 154) based on the data bits by communicating on the communication line for example.

Figure 4:
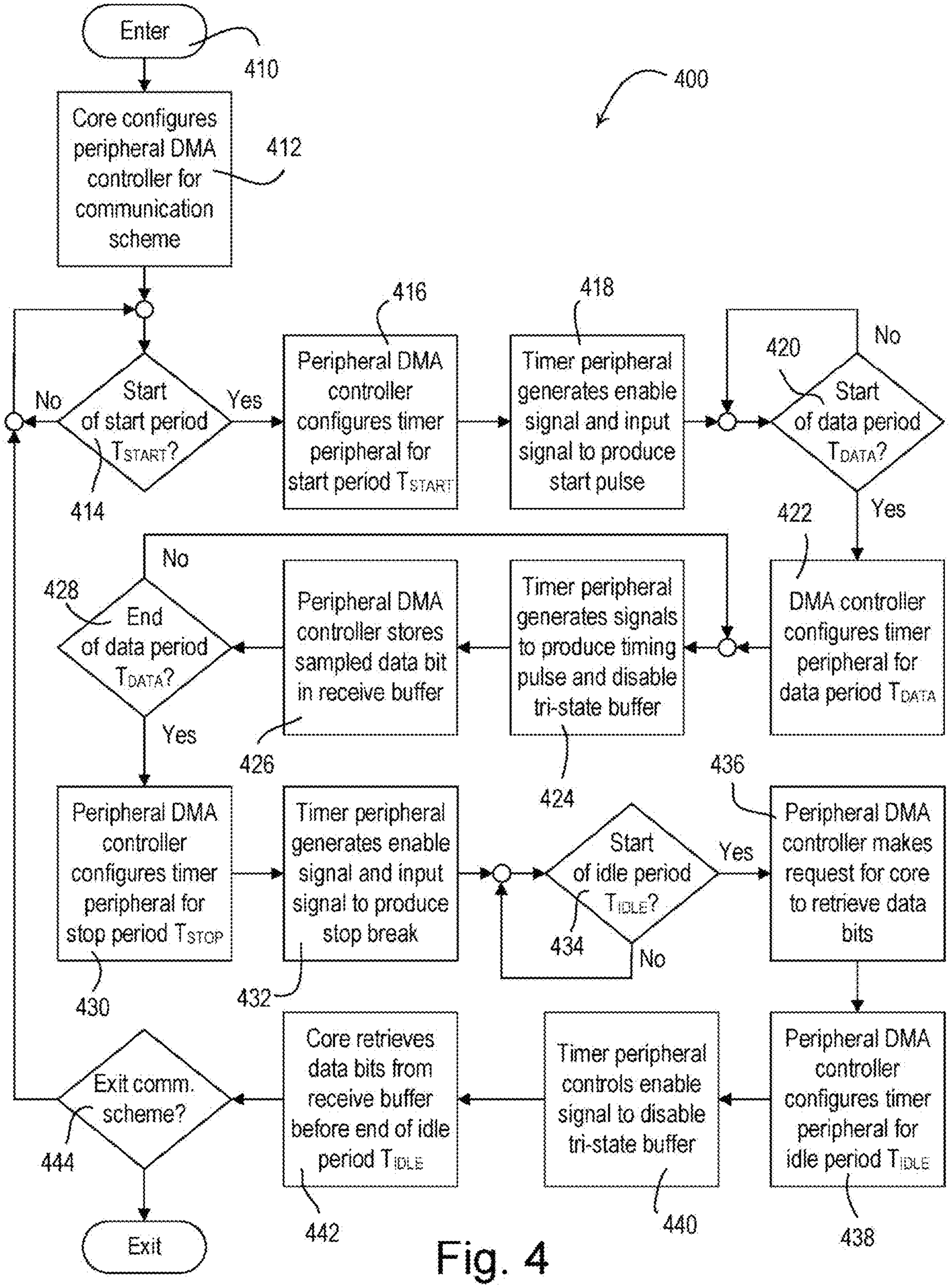
FIG. 4 is a flowchart of an example procedure for enabling communications between a processor and a reporting device on a communication line according to a bidirectional communication scheme.

FIG. 4 is an example procedure 400 for enabling communications between a processor (e.g., the processor 210) and a reporting device (e.g., the reporting device 220) on a communication line (e.g., the control link 240) according to a bidirectional communication scheme. The processor and the reporting device may be part of a control device (e.g., the originating device 102, the origination device 152, and/or the control device 200). The control device may also comprise a tri-state buffer to facilitate communication on the communication line according to the bidirectional communication scheme. The procedure 400 may be performed by a core and/or one or more peripherals of the processor (e.g., the core 218 and/or one or more peripherals 219*a*-219*n*). The processor (e.g., the core) may perform the procedure 400 when communication with the reporting device is desired. For example, the processor (e.g., the core) may begin execution of the procedure 400 at 410, e.g., at startup of the control device (e.g., the originating device 102, the originating device 151, and/or the control device 200).

At 412, the processor (e.g., the core) may configure the one or more peripherals of the processor (e.g., the peripheral DMA controller) according to a communication scheme defined by the reporting device. For example, as described herein, the communication scheme may be a bidirectional communication scheme. The bidirectional communication scheme may allow for communication on the communication line in a single direction at any given time instance, for example, for communication-management signals (e.g., start symbols, interrupt symbols, and/or stop symbols) from the processor to the reporting device and/or for data (e.g., data bits) from the reporting device to the processor.

For example, as noted with respect to FIG. 3, the bidirectional communication scheme may define a plurality of communication cycle periods $T_{CYCLE}$. Each communication cycle period $T_{CYCLE}$ may include a start period $T_{START}$, a data period $T_{DATA}$, a stop period $T_{STOP}$, and an idle period $T_{IDLE}$. Each data cycle $T_{DATA}$ may include a plurality of sampling periods $T_{SMPL}$ with each sampling period $T_{SMPL}$ having a timing period $T_{TIM}$ (e.g., with a timing pulse) before a bit period $T_{BIT}$ (e.g., with one or more data bits). The start period $T_{START}$ may include a start symbol (e.g., a start pulse) that may indicate the beginning of each data period $T_{DATA}$ to the reporting device. For example, the reporting device may communicate one or more data bits to the processor (e.g., to the peripheral DMA controller of the processor) during each bit period $T_{BIT}$. The data period $T_{DATA}$ may include a predetermined number of sampling periods $T_{SMPL}$. (e.g., approximately 28) with each having alternating timing periods (e.g., for interrupt symbols) and bit periods (e.g., for data bits). The stop period $T_{STOP}$ may include a stop symbology (e.g., a stop break) that may indicate the end of each data period $T_{DATA}$ to the reporting device.

At 412, the core of the processor may configure the peripheral DMA controller for initiating each of the periods of the communication cycle periods $T_{CYCLE}$ (e.g., the start period $T_{START}$, the data period $T_{DATA}$, the stop period $T_{STOP}$, and the idle period $T_{IDLE}$) during execution of the bidirectional communication scheme. For example, the core may configure the peripheral DMA controller to reconfigure the timer peripheral at the beginning of each of the periods of the communication cycle periods $T_{CYCLE}$ and to store the sampled data bits in a receive buffer of the peripheral DMA controller (e.g., the receive buffer 221 of the peripheral DMA controller 219*b*).

The processor may then begin executing the bidirectional communication scheme to communicate with the reporting device. When it is the start of the start period $T_{START}$ at 414, the peripheral DMA controller may configure the timer peripheral for operation during the start period $T_{START}$ at 416. For example, the peripheral DMA controller may configure the timer peripheral to generate the timing signal $V_{TIME}$ and the enable signal $V_{EN}$ for producing the start symbol (e.g., the start symbol 310) during the start period $T_{START}$.

At 418, the timer peripheral may be configured to control an input port and/or an enable port of the tri-state buffer to produce the start symbol during the start period $T_{START}$ according to the bidirectional communication scheme. For example, the timer peripheral may be configured to generate the enable signal $V_{EN}$ that is provided to the enable port of the tri-state buffer, and generate the timing signal $V_{TIME}$ that is provided to the input port of the tri-state buffer as configured by the peripheral DMA controller at 416. The timer peripheral may be configured to enable the tri-state buffer during the start period $T_{START}$. When the tri-state buffer is enabled, the timer peripheral may be configured to control the communication signal $V_{COMM}$ on the communication line to the reporting device. For example, when the tri-state buffer is enabled, the timer peripheral may control the state of the communication signal $V_{COMM}$ on the communication line (e.g., control whether the communication signal $V_{COMM}$ on the communication line is in a low state or a high state) based on the state of the timing signal $V_{TIME}$ provided to the input port of the tri-state buffer. The timer peripheral may be configured the drive the timing signal $V_{TIME}$ high to generate the start symbol during the start period $T_{START}$.

When it is the start of the data period $T_{DATA}$ at 420, the peripheral DMA controller may configure the timer peripheral for operation during the data period $T_{DATA}$ at 422. The peripheral DMA controller may configure the timer peripheral for periodic operation during the plurality of sampling periods $T_{SMPL}$ during the data period $T_{DATA}$. For example, the peripheral DMA controller may configure the timer peripheral to generate the timing signal $V_{TIME}$ and the enable signal $V_{EN}$ for producing the interrupt symbols (e.g., the interrupt symbols 320) during the timing periods $T_{TIM}$ and for disabling the tri-state buffer during the bit periods $T_{BIT}$.

At 424, the timer peripheral may be configured to control the input port and/or the enable port of the tri-state buffer to produce the interrupt symbols during the timing periods $T_{TIM}$ and disable the tri-state buffer during the bit periods $T_{BIT}$ according to the bidirectional communication scheme. For example, the timer peripheral may be configured to generate the enable signal $V_{EN}$ and as configured by the peripheral DMA controller at 422. The timer peripheral may be configured to enable the tri-state buffer during the timing periods $T_{TIM}$ and disable the tri-state buffer during the bit times $T_{BIT}$. When the tri-state buffer is enabled, the timer peripheral may be configured to control the timing signal $V_{TIME}$ to the low state and then the high state to generate the interrupt symbols during the timing period $T_{TIM}$. When the tri-state buffer is disabled, the reporting device may be configured to transmit data to the processor (e.g., to the first port 212 of the processor 210) via the communication line according to the bidirectional communication scheme defined by the reporting device. For example, the timer peripheral may be configured to disable the tri-state buffer by controlling the enable signal $V_{EN}$ that is provided to the enable port of the tri-state buffer, to be in the low state. When the tri-state buffer is disabled, the reporting device may be configured to control the state of the communication signal $V_{COMM}$ on the communication line (e.g., control whether the communication signal $V_{COMM}$ is in the low state or the high state) to communicate one or more data bits to the processor during the bit times $T_{BIT}$.

At 426, the processor may be configured to store data bits received from the reporting device in a receive buffer (e.g., of the peripheral DMA controller). For example, the peripheral DMA controller may be configured to store the data bits received from the reporting device in the receive buffer during each bit period $T_{BIT}$ of the data period $T_{DATA}$ defined by the bidirectional communication scheme. For example, the peripheral DMA controller may be configured to sample the communication signal $V_{COMM}$ on the communication line at an input port of the processor (e.g., the third port 216 of the processor 210) to determine the data bits received from the reporting device. The peripheral DMA controller may be configured to store sampled data bits in the receive buffer of the peripheral DMA controller. If it is not the end of the data period $T_{DATA}$ at 428, the procedure 400 loops around for the operations of the next sampling period $T_{SMPL}$ at 422, 424, 426.

When it is the end of the data period $T_{DATA}$ (e.g., the start of the stop period $T_{STOP}$) at 420, the peripheral DMA controller may configure the timer peripheral for operation during the stop period $T_{STOP}$ at 430. For example, the peripheral DMA controller may configure the timer peripheral to control the timing signal $V_{TIME}$ and the enable signal $V_{EN}$ for producing the stop symbol (e.g., the stop symbol 340) during the stop period $T_{STOP}$. At 432, the timer peripheral may be configured to control the input port and/or the enable port of the tri-state buffer to produce the stop symbol during the stop period $T_{STOP}$ according to the bidirectional communication scheme. For example, the timer peripheral may be configured to generate the enable signal $V_{EN}$ and the timing signal $V_{TIME}$ as configured by the peripheral DMA controller at 430. The timer peripheral may be configured to enable the tri-state buffer during the stop period $T_{STOP}$. When the tri-state buffer is enabled, the timer peripheral may be configured the drive the timing signal $V_{TIME}$ low to generate the stop symbol during the stop period $T_{STOP}$.

When it is the start of the idle period $T_{IDLE}$ at 434, the peripheral DMA controller may at 436 make a request for the core of the processor to retrieve the sampled data bits (e.g., as received during the data period $T_{DATA}$) from the receive buffer of the peripheral DMA controller (e.g., to be retrieved by the core before the end of the idle period $T_{IDLE}$). At 438, the peripheral DMA controller may configure the timer peripheral for operation during the idle period $T_{IDLE}$. For example, the peripheral DMA controller may configure the timer peripheral to the enable signal $V_{EN}$ for disabling the tri-state buffer during the idle period $T_{IDLE}$. At 440, the timer peripheral may be configured to control the enable port of the tri-state buffer to disable the tri-state buffer, which may cause the output port of the tri-state buffer to be in the high-impedance state during the idle period $T_{IDLE}$. For example, the timer peripheral may be configured to control the enable signal $V_{EN}$ (e.g., drive the enable signal $V_{EN}$ low) as configured by the peripheral DMA controller at 438.

At 442, the processor (e.g., the core) may be configured to retrieve the sampled data bits from the receive buffer of the peripheral DMA controller during the idle period $T_{IDLE}$ in response to the request from the DMA controller in step 436. For example, the core may be configured to transfer the data bits from the receive buffer to random-access memory (RAM) of the processor. For instance, the core may be configured to retrieve the data bits from the receive buffer of the DMA during times when the core is not scheduled to perform other, potentially critical tasks or controlling or communication with other devices. If the procedure 400 should not exit at 444, the procedure 400 may loop around to provide the next communication cycle $T_{CYCLE}$ of the communication signal $V_{COMM}$ on the communication line. Otherwise, the procedure 400 may exit at 446. For example, the processor (e.g., the core) may decide to exit the procedure 400 when the processor is in a sleep mode (e.g., a low-power mode), the processor is preparing to shut down, and/or the processor is disconnected from the reporting device.

Accordingly, through the use of the procedure 400, the processor may communicate with the reporting device over the communication line using one or more of its peripherals, store any received communication bits from the reporting device in a buffer of the processor, and configure the core to retrieve the data bits from the receive buffer during times that does not interrupt the core's ability to perform critical tasks or communicate with other devices. As such, by leveraging the use of the peripherals and the tri-state buffer, the burden of managing the communication with the reporting device is removed from the core, which reduces the number of interrupts required to service, control, and/or communicate with the reporting device.

In addition to what has been described herein, the methods and systems may also be implemented in a computer program(s), software, or firmware incorporated in one or more computer-readable media for execution by a computer(s) or processor(s), for example. Examples of computer-readable media include electronic signals (transmitted over wired or wireless connections) and tangible/non-transitory computer-readable storage media. Examples of tangible/non-transitory computer-readable storage media include, but are not limited to, a read only memory (ROM), a random-access memory (RAM), removable disks, and optical media such as CD-ROM disks, and digital versatile disks (DVDs).

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure.

What is claimed is:

1. A control device comprising:

a reporting device coupled to a communication line;

a buffer circuit comprising an output port coupled to the communication line; and a processor comprising a core, a timer peripheral, and a peripheral direct memory access controller;

wherein the core is configured to configure the timer peripheral and the peripheral direct memory access controller to control the output port of the buffer circuit according to a communication scheme defined by the reporting device;

wherein the peripheral direct memory access controller of the processor is configured to receive at least one data bit via the communication line when the buffer circuit is disabled, and store the at least one data bit received in a receive buffer; and wherein the buffer circuit is configured to generate an interrupt symbol on the communication line when the buffer circuit is enabled, wherein the buffer circuit is enabled and disabled in response to the timer peripheral.

2. The control device of claim 1, wherein the peripheral direct memory access controller is configured to store data bits received from the reporting device during a sampling period in the receive buffer; and wherein, after the sampling period, the peripheral direct memory access controller is configured to transfer the data bits from the receive buffer to a random-access memory (RAM) of the processor, and the core is configured to read the data bits from the RAM.

3. The control device of claim 2, wherein the core is configured to retrieve the at least one data bit from the receive buffer during times when the core is not performing critical tasks or controlling or communication with other devices.

4. The control device of claim 1, wherein the communication scheme defines a plurality of communication cycle periods, wherein each communication cycle period comprises a start period, a data period, a stop period, and an idle period.

5. The control device of claim 4, wherein each data period comprises a plurality of sampling periods with each sampling period having a timing period before a bit period, and wherein the reporting device is configured to communicate one or more data bits to the peripheral direct memory access controller of the processor during each bit period.

6. The control device of claim 4, wherein the core is configured to retrieve the at least one data bit from the receive buffer during the idle period.

7. The control device of claim 6, wherein the peripheral direct memory access controller is configured to configure the timer peripheral to generate an enable signal for disabling the buffer circuit during the idle period.

8. The control device of claim 4, wherein the core of the processor is configured to configure the peripheral direct memory access controller for initiating the start period, the data period, the stop period, and the idle period of the communication cycle periods during execution of the communication scheme.

9. The control device of claim 8, wherein the core of the processor is configured to configure the peripheral direct memory access controller to reconfigure the timer peripheral at the beginning of the start period, the data period, the stop period, and the idle period of the communication cycle periods and to store the at least one data bit in the receive buffer.

10. The control device of claim 4, wherein the peripheral direct memory access controller is configured to configure the timer peripheral to generate a timing signal and an enable signal for producing a start symbol during the start period.

11. The control device of claim 10, wherein the timer peripheral is configured to drive an enable signal and a timing signal high to generate the start symbol, wherein the start symbol is defined by a longer time duration than the interrupt symbol.

12. The control device of claim 1, wherein the communication scheme defines a timing of a transmission of the at least one data bit from the reporting device to the processor along the communication line.

13. The control device of claim 12, wherein the processor comprises a receive port coupled to a communication port of the reporting device via the communication line.

14. The control device of claim 1, wherein the buffer circuit comprises an enable port configured to receive an enable signal from the timer peripheral for enabling and disabling the buffer circuit.

15. The control device of claim 1, wherein the buffer circuit comprises an input port configured to receive a timing signal from the timer peripheral, wherein the processor and the reporting device are configured to generate a communication signal on the communication line.

16. The control device of claim 15, wherein the processor is configured to:

enable the buffer circuit and control a timing signal to cause the buffer circuit to generate the interrupt symbol during a timing period in the communication signal on the communication line.

17. The control device of claim 16, wherein the processor is configured to:

disable the buffer circuit to allow the reporting device to transmit the at least one data bit via the communication line in a bit period immediately following the interrupt symbol.

18. The control device of claim 17, wherein the peripheral direct memory access controller is configured to store the at least one data bit received via a receive port in the receive buffer during the bit period.

19. The control device of claim 18, wherein the core of the processor is configured to retrieve the at least one data bit from the receive buffer.

20. The control device of claim 19, wherein the core is configured to retrieve the at least one data bit from the receive buffer independent of any interaction of the timer peripheral and the peripheral direct memory access controller with the reporting device.

* * * * *